J. L. STEFFEN.
METHOD AND MEANS FOR DETERMINING ROUTES AND LOCATIONS ON HIGHWAYS.
APPLICATION FILED APR. 17, 1919.

1,334,120.

Patented Mar. 16, 1920.

Inventor:
John L. Steffen,
By Schmidt + Hanson
attys

UNITED STATES PATENT OFFICE.

JOHN L. STEFFEN, OF CHICAGO, ILLINOIS, ASSIGNOR OF ONE-HALF TO FREDERICK W. STEFFEN, OF CHICAGO, ILLINOIS.

METHOD AND MEANS FOR DETERMINING ROUTES AND LOCATIONS ON HIGHWAYS.

1,334,120.   Specification of Letters Patent.   Patented Mar. 16, 1920.

Application filed April 17, 1919. Serial No. 290,694.

*To all whom it may concern:*

Be it known that I, JOHN L. STEFFEN, a citizen of the United States, residing at Chicago, in the county of Cook and State of Illinois, have invented new and useful Improvements in Methods and Means for Determining Routes and Locations on Highways, of which the following is a specification.

My invention relates to an improved method and means for determining routes and locations on highways to better enable any traveler when proceeding from any point of origin in a journey over a highway to any point of destination to perform the journey without the liability of turning into the wrong road when at road intersections, and to better enable the traveler to definitely locate residences.

There are several guide systems on the market for the traveler's use. The systems most commonly used involve a guide book which must be used in conjunction with the vehicle speedometer, the book showing the distances from one place to the next over the road traveled, the distances being in miles or fractions thereof and the location of the vehicle at any time being determined solely by checking up the speedometer with the distance designated in the guide book. This is a very laborious and unreliable system, particularly for those who are strangers in the country over which they are traveling.

The object of my invention is to provide such simple method and means that any one may readily and accurately determine a route or a location without calculation or observance of instruments, and without continually referring to a guide book or map. In accordance with my invention each road intersection is numbered, a post or sign post being placed at each road intersection and bearing a number corresponding to the number on a map made of the particular locality. By consulting the map of any locality over which it is desired to travel a route list consisting of a series of numbers of road intersections can be compiled and then used in conjunction with the sign numbers located at the road intersections, each sign post or board having pointers bearing adjacent intersection numbers and designating the directions to travel to reach such intersections.

When a traveler reaches a certain intersection numbered in accordance with his route list he can readily determine from the sign the direction in which he must travel to find the next number on his route list and the intersection corresponding thereto. The dwelling of any resident on a certain road can be accurately located by the traveler who has been previously advised between what intersections, designated by numbers on his route list, the dwelling is located and how far from one of said intersections.

By referring to the accompanying drawings forming part of this specification, the invention and its purposes will be more clearly understood. On the drawings—

Figure 2:
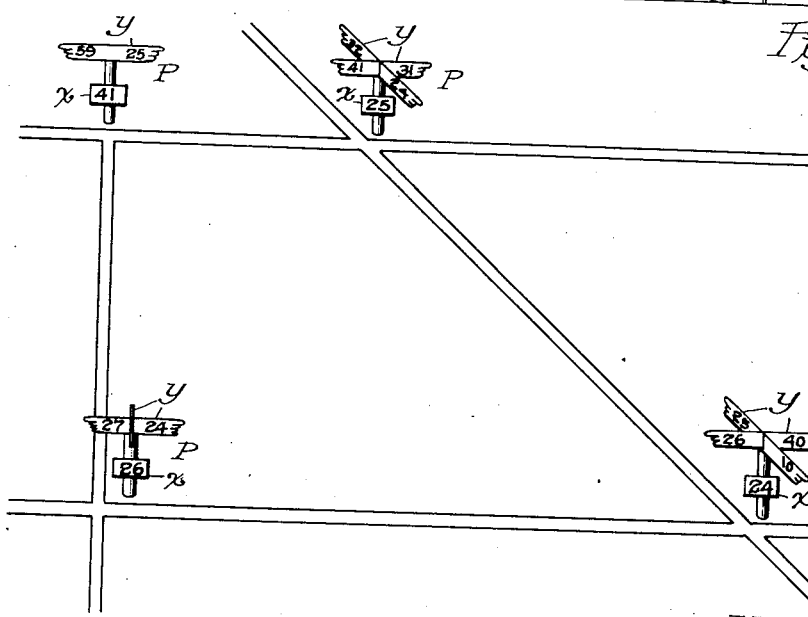
Fig. 2 is a map to an enlarged scale of a section of Fig. 1 showing how guide posts are applied at the intersections.

In accordance with my invention a suitable object such as a sign post P is provided at every road intersection or juncture upon which appears the number $x$ of such intersection or juncture. On each sign post are also placed pointers $y$ which parallel the respective roads and bear numbers corresponding to the numbers of the next intersections or junctures on the roads in the different directions. This is illustrated in Fig. 2.

Figure 1:
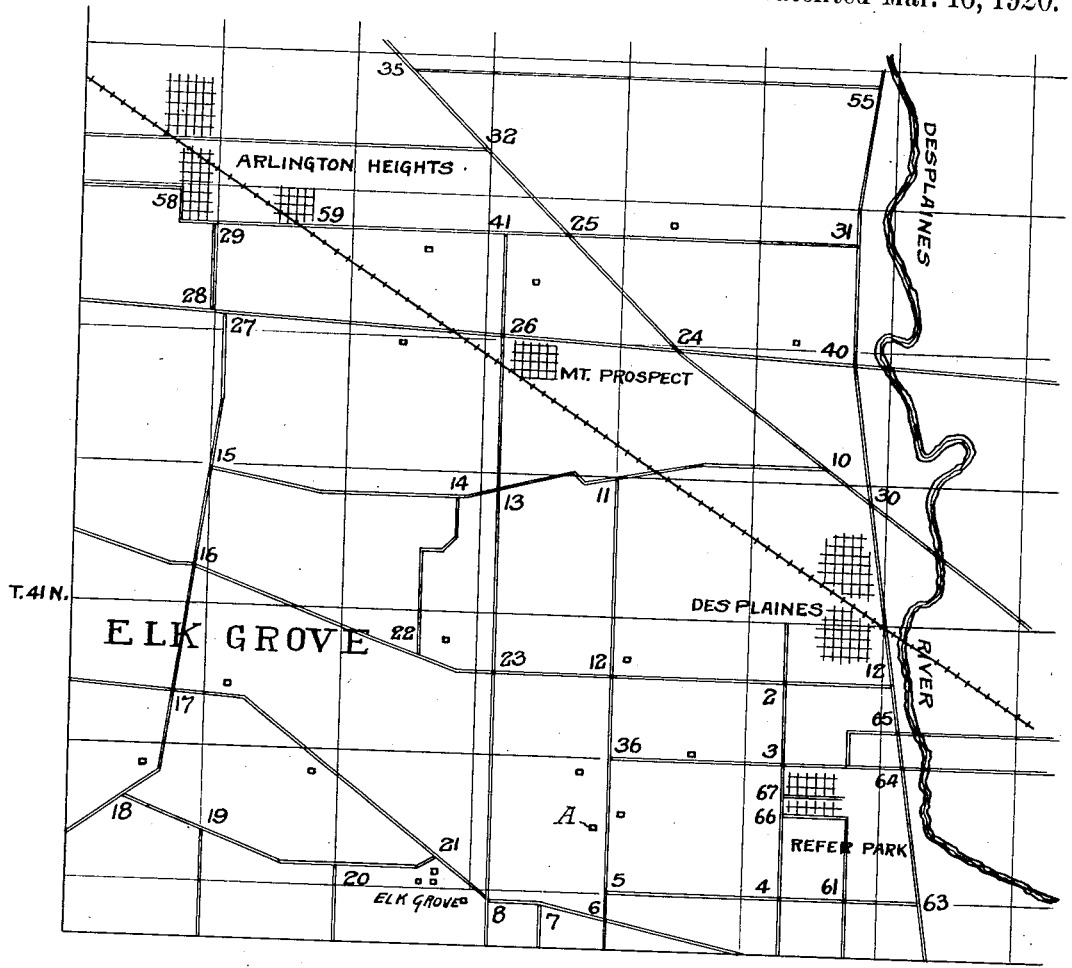
Figure 1 is a map showing a section of country with its roads, and designating numbers applied to the various intersections and meeting points of the roads.

As shown in Fig. 1 the guide map indicates the various road intersections or junctures and at each such intersection or juncture the number is applied on the map which corresponds to the number of the intersection or juncture appearing on the sign post thereat. From these maps the traveler can readily determine a route which he must follow to get from one place to another. He compiles a route list consisting of a series of numbers corresponding to the successive intersections he must pass during his trip. Referring to Fig. 1, suppose he desires to travel from Des Plaines to Elk Grove. He can choose several routes. To take one route, he finds by consulting the map that he must pass from Des Plaines through the intersections numbered respectively 2, 3, 67, 66, 4, 5, 6, 7 and 8 before reaching Elk Grove. He can remember these numbers or jot them down so that this route list would appear as Des Plaines—2—3—67—66

—4—5—6—7—8—Elk Grove. He might choose the route Des Plaines—2—3—36—5—6—7—8—Elk Grove or the route Des Plaines—2—12—36—5—6—7—8—Elk Grove. Having chosen his route he sets out and when he reaches intersection No. 2 he will find on the guide post at that section the pointers which show him in which direction to travel to find intersection No. 3, or intersection No. 12 if he has chosen the route including that intersection. At each intersection he finds the information for enabling him to reach the next intersection on the route he has chosen.

With my improved method it becomes a very simple matter to locate and reach definite destinations on a certain route such, for example, as a residence. With my method a rural resident would express his location in terms of numbers. For example a rural resident living in the house marked by the letter "A" on the map would express his location as follows: Road 36—5. This means that he lives somewhere between the intersections numbers 36 and 5, and he can more definitely express his location as one-half mile from 5, or fourth house on east side of road from 5. Before starting on his trip the traveler who desires to reach the residence "A" will have the information necessary and the residence can be readily and quickly located.

The advantages and benefit of my improved method are that a traveler need be able only to read numbers so that after he has chosen or has been given a route he can readily find the various intersections and thus reach his destination. It is not necessary that the traveler carry a map on his journey nor that he continually refer to a speedometer or other instrument, but he merely reads on each intersection sign post the direction for reaching the next intersection appearing on his route list.

Having described my invention, I claim as follows:

1. The method for determining routes on highways which consists in identifying each road intersection by a different number applied at such intersection.

2. Means for determining routes and locations on highways comprising a map having a number applied to each road intersection indicated thereon for designating said intersection, said numbers corresponding with the numbers actually placed at the road intersections.

3. A system for determining routes and locations on highways comprising indicating members at road intersections bearing numbers designating the respective intersections, and a map on which the road intersections are indicated and numbered accordingly.

4. A system for determining routes and locations on highways comprising indicating members at road intersections bearing numbers designating the respective intersections and bearing direction pointers paralleling all roads radiating from the respective intersections, such pointers bearing numbers designating the adjacent intersections in the directions indicated.

In witness whereof, I hereunto subscribe my name this 15th day of April, A. D. 1919.

JOHN L. STEFFEN.